W. AGER.
Buckwheat Huller.

No. 9,064. Patented June 29, 1852.

UNITED STATES PATENT OFFICE.

WILSON AGER, OF ROHERSBURG, PENNSYLVANIA.

HULLING BUCKWHEAT.

Specification of Letters Patent No. 9,064, dated June 29, 1852.

*To all whom it may concern:*

Be it known that I, WILSON AGER, of Rohersburg, in the county of Columbia and State of Pennsylvania, have invented or discovered a new and useful Method for Scouring or Cleaning Buckwheat; and I do hereby declare the following to be a full, clear, and exact description of the same, reference being had to the accompanying drawings, representing one of the methods of dressing the runner stone for accomplishing the same, in which—

Figure 1:
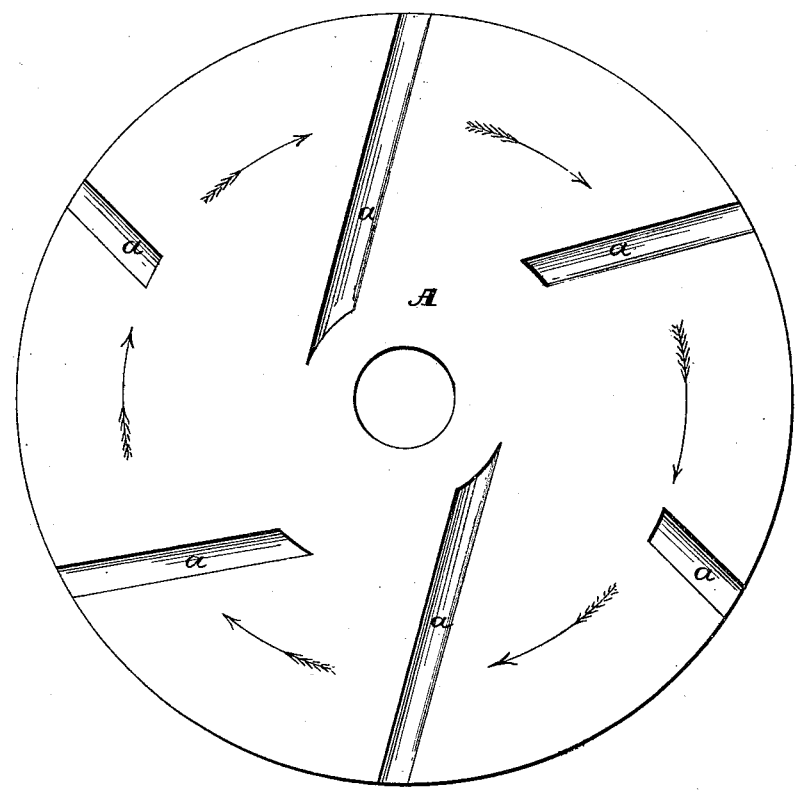
Figure 2:
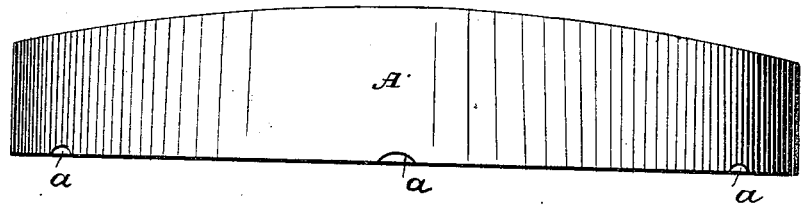

Figure 1, shows the face of the runner with the furrows and lands thereon, and Fig. 2, a side view representing the shape of the furrow.

Similar letters in both the figures represent the same parts.

The nature of my invention or discovery, consists in passing the grains of buckwheat through between a pair of horizontal stones, which may be of the kind commonly known as "Country Stones," (the "French bur," being generally too sharp for the purpose), and providing the runner with rounded furrows, inclining in the direction of the motion of the stone, which is precisely the contrary of the universal practice of inclining the furrows in a direction, contrary to that of the motion of the stone. The object being to check the too rapid passage of the grains through the stones, and to give them (the grains) a motion in the direction of their longest diameter, which removes the black blossom from the end of the grains, and opens the hulls, which to the best of my knowledge, has never before been done by machinery. The bed stone may have a smooth face, and either the top or bottom stone may be the runner.

To enable others skilled in the art to use my invention or discovery, I will proceed to describe the same, with reference to the drawings.

A, represents a runner, open at the eye sufficiently to admit of feeding in the grains. The furrows a, a, a, &c., incline in the direction of the motion of the runner, which is represented by the arrows in the drawing; this being precisely the contrary, of the universal practice of dressing stones for this purpose. The furrows may be few in number, and only about one-third of them should extend from near the eye to the skirt of the stone. One-third should also extend from the skirt to about midway of the distance from said skirt to the eye, the remaining one-third extending from the skirt about half of the above mentioned distance, or one-sixth of the diameter of the stone; these proportions I have found in practice to succeed well, but they may be slightly varied and produce a good result. The number of grooves or furrows must depend upon the diameter of the stones. The bottoms of the furrows a, a, &c., are represented as being circular, or a segment of a circle, but may be varied somewhat from that precise form. I do not therefore desire to confine myself to precise forms or proportions, so long as I make the inclination of the furrows, in the direction of the motion of the runner. This method of scouring buckwheat, which rotates the grains partially in the direction of their longest diameters, removes the blossom from the end of the grain, and opens the hull, which can be easily removed. The round furrow merely rubs, checks, and turns the grains, without cutting them, and leaves them perfectly divested of all extraneous matter, which could be pulverized and mixed inseparably with the flour; and when the grain thus prepared is ground, it produces a flour as white as wheat flour, which has not, to my knowledge, ever been done before. I am therefore able to produce a more merchantable article, and one more free from impurities than any heretofore known.

The bed stone may be perfectly smooth on its surface having no grooves.

The operation is as follows: The grains in passing over the land part of the stone, are made to rotate in the direction of their short diameter, and at the same time travel toward the skirt of the stone, until they reach the furrows, which by the peculiar manner in which they are drafted—their forward inclination, and the air drawn into them, checks the grains, and whirls or rotates them in the direction of their longest diameter, which loosens and knocks off the stub or blossom on its end, and scours the grains; the larger portion of the grains come out nearly divested of the hulls, and the whole of them divested of the black blossom. After being momentarily whirled by the first furrow, the grains are again carried forward and toward the skirt until caught and again rotated by the next furrow, and so on until it leaves the stone perfectly cleansed.

Having thus fully described my invention, what I claim therein as new and desire to secure by Letters Patent, is:

The method herein described of scouring or hulling buckwheat, by passing it through between horizontal stones, the runner having furrows on its face, drafted substantially as herein represented and cut in the direction of the motion of the stone, keeping the grains from leaving the stones too fast and for rotating them both on their short and long diameters; and the bed stone left without furrows, in the manner and for the purpose herein set forth.

WILSON AGER.

Witnesses:
T. C. DONN,
A. B. STOUGHTON.